July 2, 1940.  J. M. F. OYEN  2,206,424

COFFEE MAKING MACHINE

Filed March 6, 1939   8 Sheets-Sheet 1

INVENTOR
John M. F. Oyen

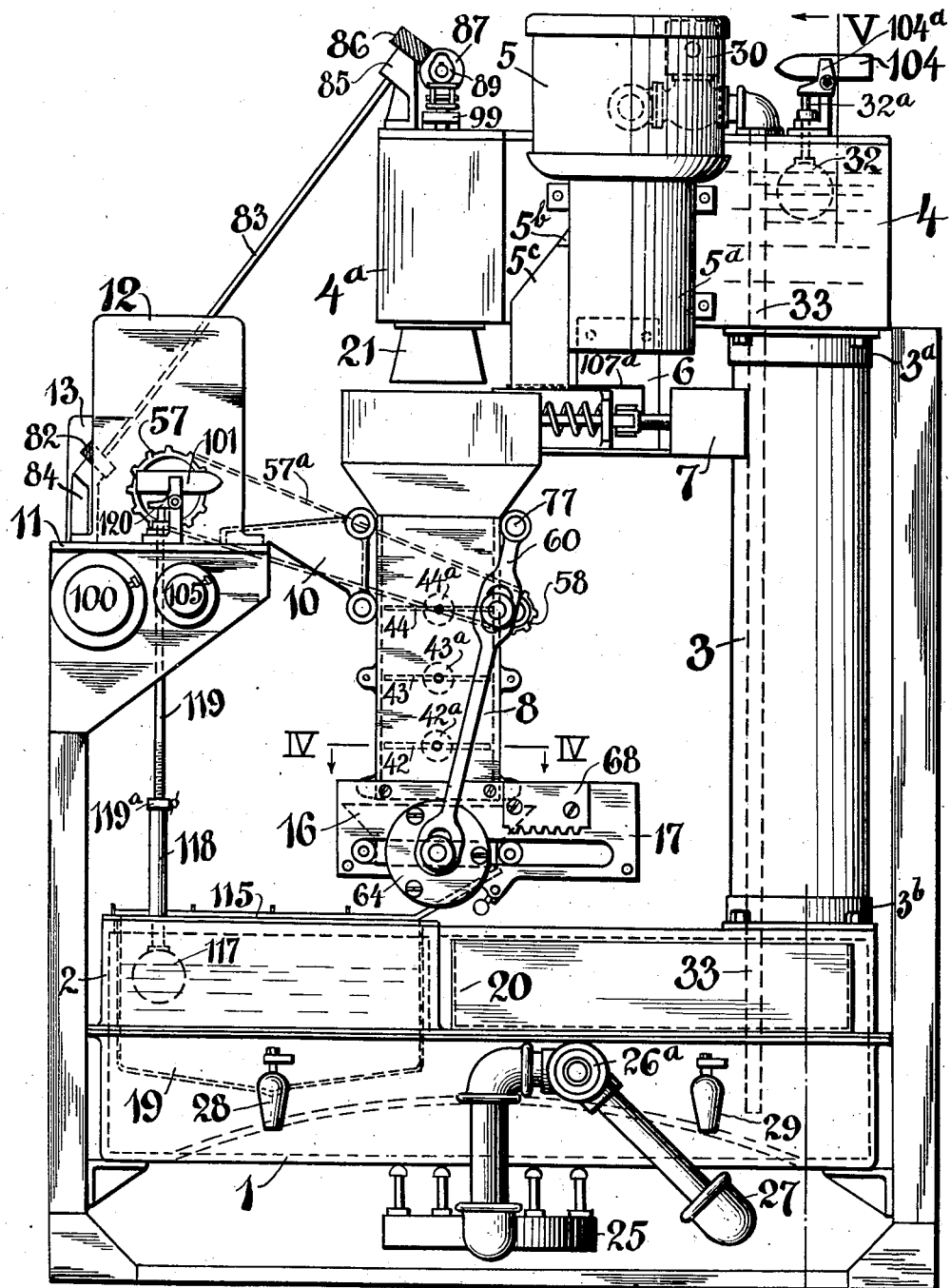

INVENTOR
John M. F. Oyen

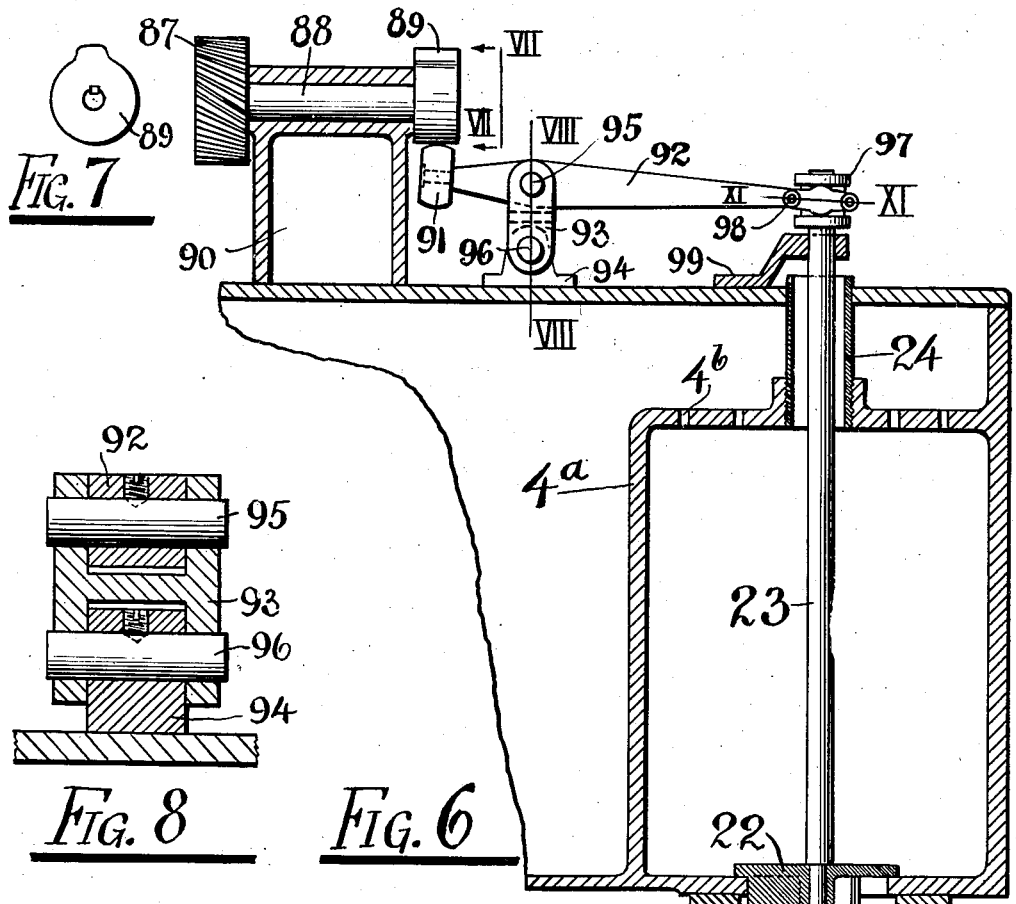

INVENTOR
John M. F. Oyen

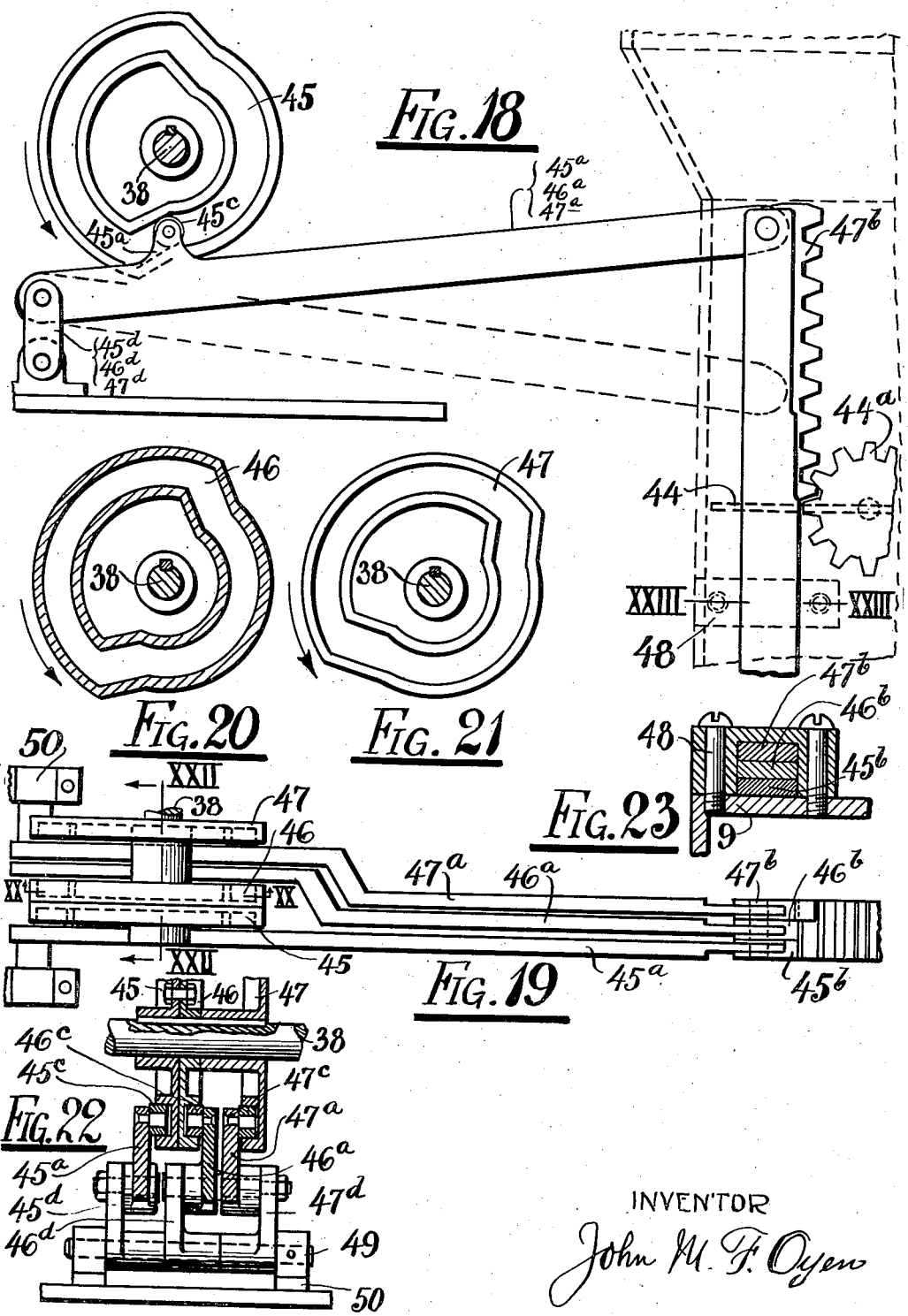

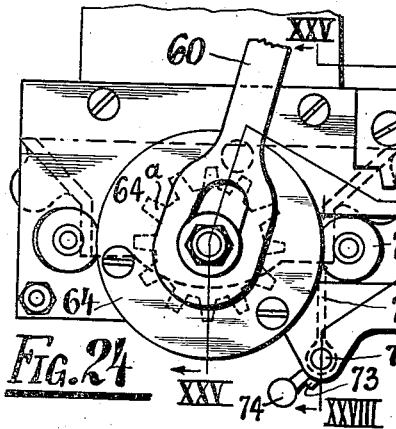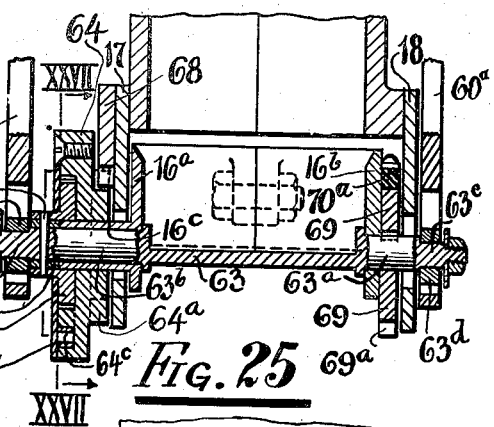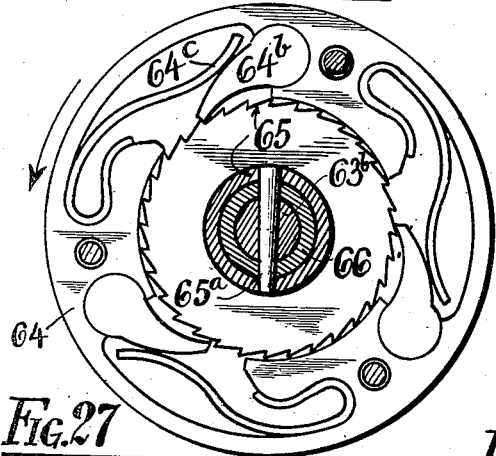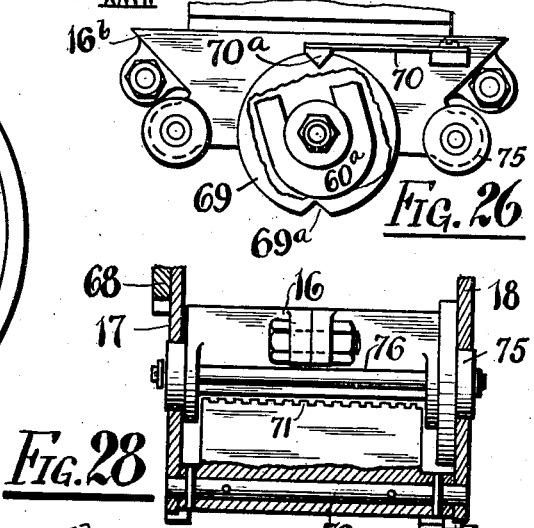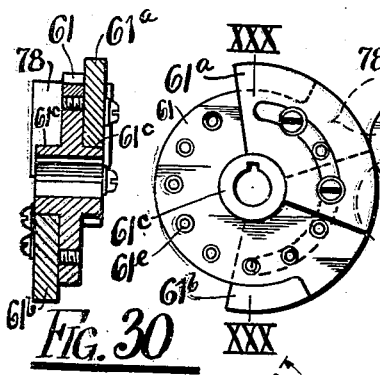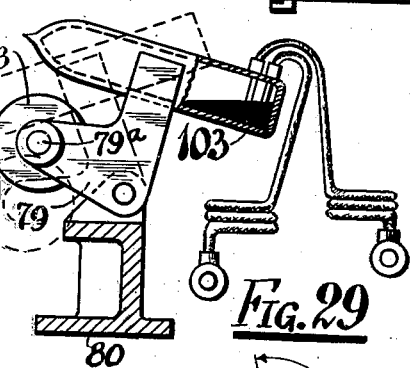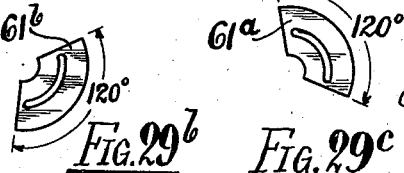

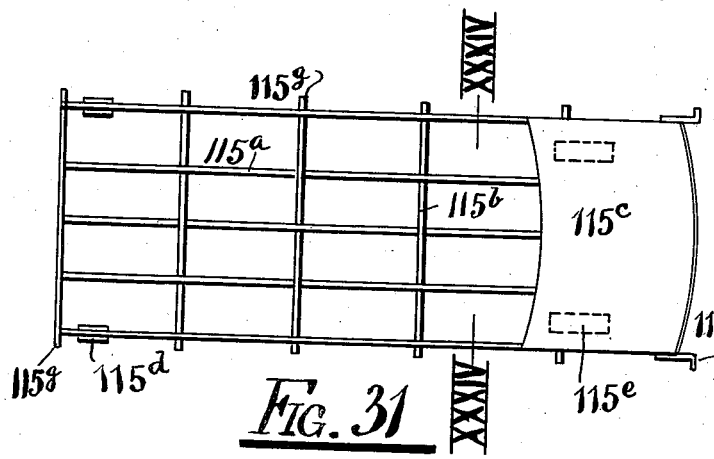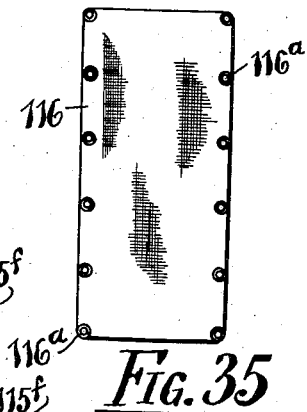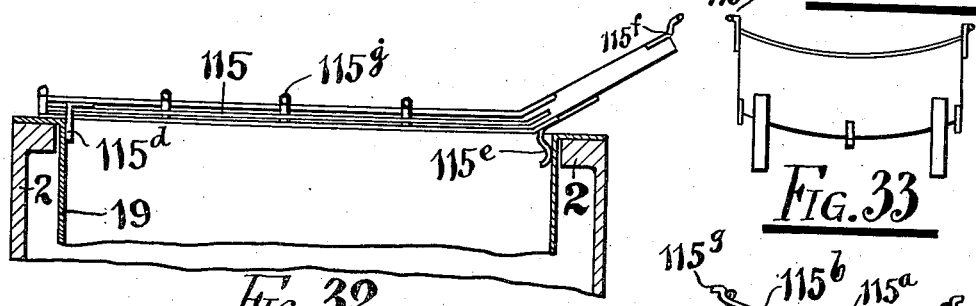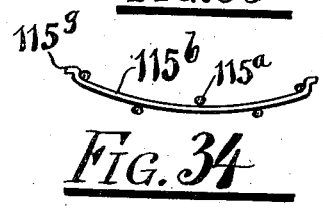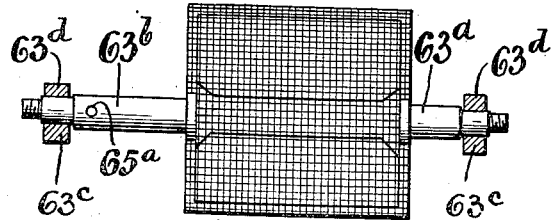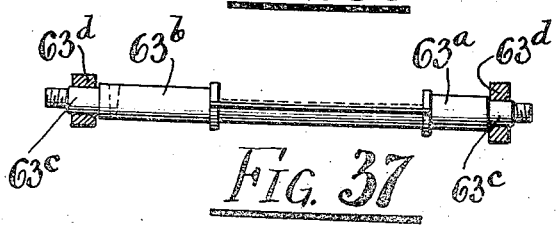

Patented July 2, 1940

2,206,424

UNITED STATES PATENT OFFICE 2,206,424

COFFEE MAKING MACHINE

John M. F. Oyen, Oakland, Calif.

Application March 6, 1939, Serial No. 260,091

12 Claims. (Cl. 53—3)

The present invention relates to a coffee making machine of the type in which the beverage is made by letting hot water percolate through a series of superposed coffee supporting screens in a stationary vertical percolating chamber, the coffee supported by the screens at timed intervals being advanced downwardly, new coffee and water being added to the topmost screen, the liquid coffee going into a storage tank and the coffee grounds on the lowermost screen being discharged into a separate receptacle.

One of the objects of the present invention is to store a supply of roasted coffee beans at the top of the machine, to grind these coffee beans in the normal running of the machine and to deliver the freshly ground coffee to the percolating chamber, thereby producing a beverage of superior aroma, it being a well established fact that the coffee aroma is speedily lost when coffee is stored in the granulated state.

Another object is to make the machine more compact by omitting the so-called interceptor plates between the coffee supporting screens.

A further object is to insure a beverage of absolute clarity without any residue by positioning a filter between the lowermost coffee supporting screen and the liquid coffee tank.

Still another object is to make all the screens in the machine reverse their position at each cycle, thus rendering them self-cleaning.

In the drawings:

Fig. 3 is a front elevation of the machine.

Fig. 4 is a section taken on line IV—IV on Fig. 3.

Fig. 6 is a section taken on line VI—VI Fig. 1.

Fig. 7 is an elevation on line VII—VII Fig. 6.

Fig. 8 is a large scale section taken on line VIII—VIII Fig. 6.

Fig. 9 is a plan view on line IX—IX Fig. 6.

Fig. 10 is a section taken on line X—X Fig. 6.

Fig. 11 is a large scale section taken on line XI—XI Fig. 6.

Fig. 18 is an elevation of screen reversing mechanism.

Fig. 19 is a plan view of screen reversing mechanism.

Fig. 20 is a section taken on line XX—XX on Fig. 19.

Fig. 21 is an elevation of a cam.

Fig. 22 is a section taken on line XXII—XXII on Fig. 19.

Fig. 23 is a section taken on line XXIII—XIII on Fig. 18.

Fig. 24 is a fragmentary front elevation of dumping carriage track.

Fig. 25 is a section taken on line XXV—XXV Fig. 24.

Fig. 26 is substantially a rear elevation of coffee dumping carriage.

Fig. 27 is substantially an elevation (enlarged) along line XXVII—XXVII Fig. 25.

Fig. 28 is substantially a section taken on line XXVIII—XXVIII Fig. 24.

Fig. 29 is an elevation of coffee mill controlling switch arrangement.

Figs. 29a, 29b and 29c are details (reduced) in the plane of Fig. 29.

Fig. 30 is a section taken on line XXX—XXX, Fig. 29.

Fig. 31 is a plan view of filter supporting frame.

Fig. 32 is a front elevation of filter supporting frame, showing also position of same in machine.

Fig. 33 is an end view of filter supporting frame.

Fig. 34 is a section taken on line XXXIV—XXXIV on Fig. 31.

Fig. 35 is a plan view of a filter in a reduced scale.

Fig. 36 is a plan view of dumping carriage screen.

Fig. 37 is a side view of dumping carriage screen.

Figure 5:
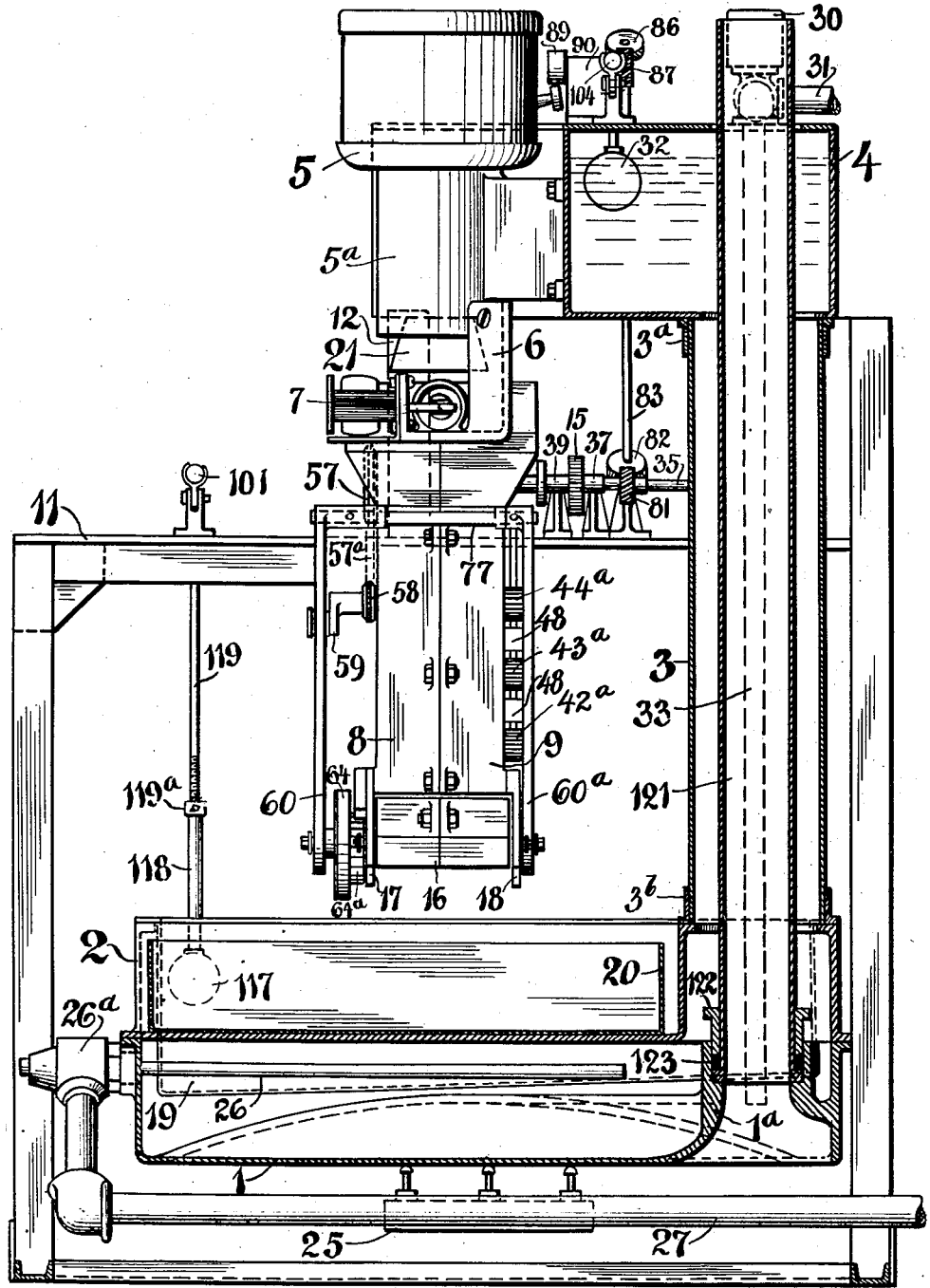
Fig. 5 is substantially a section taken on line V—V Fig. 3.

Referring to the accompanying drawings wherein like parts are designated by like numerals in the several views, the invention is illustrated as comprising a water boiler 1 with its extended cover 2 (Figs. 3 and 5) from the corner of which cover a riser 3 extends vertically to support and communicate with a header 4. A coffee mill 5 is fastened to the header 4 and carries a bracket 6 supporting a solenoid 7. An elongated percolating chamber consisting principally of the casings formed by the parts 8 and 9 is by means of a bracket 10 fastened to a plate 11 which plate also carries the driving mechanism to be described presently.

A dumping carriage 16 for discharging used coffee grounds is normally disposed beneath the coffee percolating chamber 8—9 and operates between tracks 17 and 18. A coffee reservoir 19 to receive liquid coffee is imbedded in cover 2 and extends downwardly into boiler 1 so as to retain the high temperature of the liquid coffee.

A receptacle 20 is provided for the discharged coffee grounds. Hot water is delivered to the upper end of the percolator chamber through a circular spout 21 (Figs. 3, 5, 6 and 9) which communicates with a water measuring chamber 4a disposed within the header 4. The top of the measuring chamber 4a is provided with a few small holes 4b through which the chamber is slowly filled with water. A valve 22 (Fig. 6) operates intermittently through mechanism hereafter to be described to permit the water in the measuring chamber 4a to flow through the spout 21. A stem 23 which operates the valve 22, extends upwardly through a vent tube 24, the purpose of this tube being to maintain at all times the atmospheric pressure in the measuring chamber 4a in order to insure free outlet and inlet of water from and into the measuring chamber. The spout 21 is circular (see Fig. 9) and has a number of helically curved blades intended to give the water a swirling motion in order to stir the coffee at the initial stage of percolation. A burner 25 is positioned below the boiler 1 and a thermostat 26 within the boiler operates a conventional valve 26a (see Figs. 3–5) to control the flow of gas to said burner through a supply pipe 27 and thus maintain a constant desired temperature of the water within the boiler.

A coffee faucet 28 (see Fig. 3) communicates with the coffee reservoir 19 for withdrawing coffee as described and a similar faucet 29 communicates with the boiler 1 so that hot water may be drawn off as needed. The water in the boiler is kept at the constant level by means of an electromagnetic valve 30, connected with a source of fresh water by supply pipe 31. The electromagnetic valve 30 is controlled by an electric switch 104. When the water reaches its maximum level the float 32 through its rod 32a trips the bracket 104a and with it the switch 104 energizing the magnet and closing the valve 30. An inlet pipe 33 preferably extends downwardly from the valve 30 so that cold water is admitted to the lower part of the boiler 1.

Figure 1:
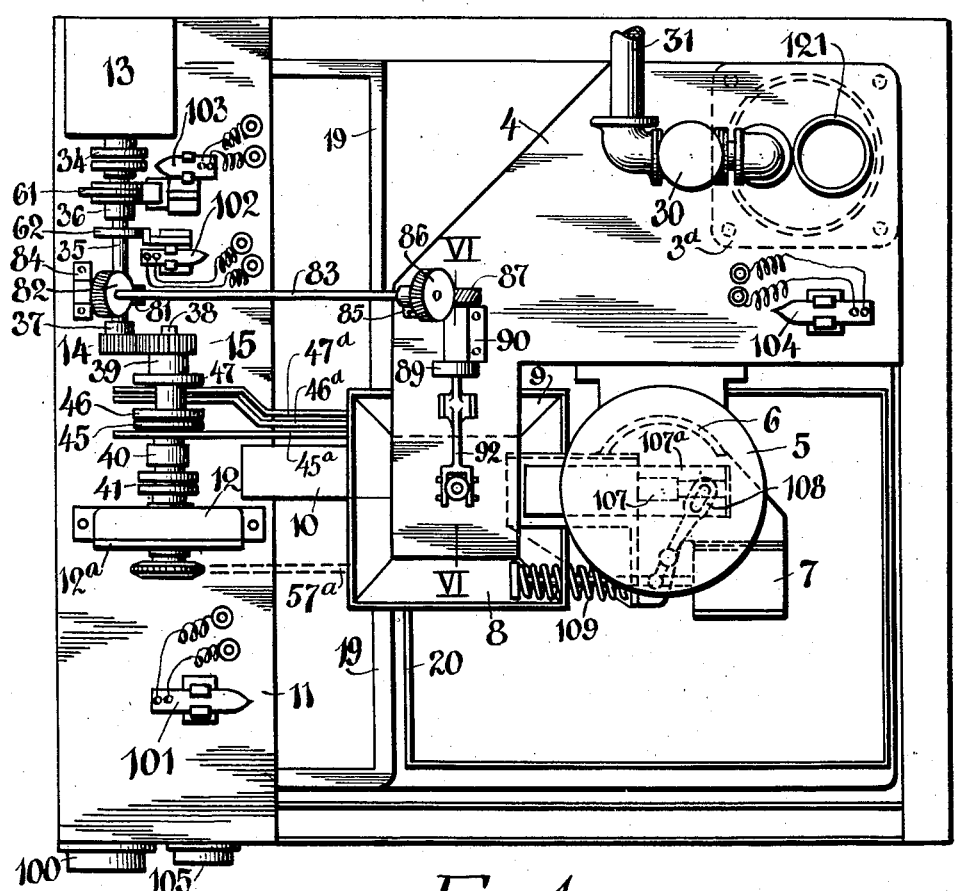
Fig. 1 is a plan view of the machine.

As shown in Fig. 1 the motor 13 through coupling 34 drives shaft 35 which is supported by bearings 36 and 37 and which at the other end has an outboard pinion 14 engaging gear 15 on shaft 38, which latter shaft is supported in bearings 39 and 40 and transmits power through coupling 41 to the timing gears in box 12 to be later described in detail.

One revolution of motor 13 and shaft 35 constitutes one cycle of operation. The ratio of pinion 14 to gear 15 is 1 to 2, therefore one half revolution of shaft 38 constitutes one cycle of operation. Besides transmitting power to the timing mechanism in box 12 the function of shaft 38 is to turn the screens 42, 43 and 44 in the percolating chamber 8—9 (see Fig. 3) in timed relation.

For this purpose cams 45, 46 and 47 are mounted on, and driven by, shaft 38 (see Figs. 1, 18 to 23). Cam 45 through roller 45c actuates lever 45a, cam 46 through roller 46c actuates lever 46a (see Fig. 22) and cam 47 through roller 47c actuates lever 47a. Now looking at the direction of motion (see arrow on Figs. 18, 20 and 21) it is evident that cam 45 is slightly advanced of cam 46, while cam 46 is similarly advanced of cam 47. Levers 45a, 46a and 47a are with pins pivotably connected respectively to rods 45b, 46b and 47b, part of which rods are shaped into a gear rack, as shown on rod 47b. These racks are positioned to engage screen pinions 42a, 43a and 44a. It will be seen from Fig. 18 that 47b operates 44a, reversing screen 44. Similarly 46b operates pinion 43a, reversing screens 43 and 45b operates pinion 42a reversing screen 42 (see Fig. 3). It is evident therefore that when shaft 38 is revolving in the direction indicated by arrow (see Figs. 18, 20 and 21) cam 45 being the most advanced will be the first one to take hold of its roller 45c, pressing it down and with it the lever 45a which in turn presses down rod 45b the rack of which engages with pinion 42a, reversing lowermost screen 42. The next cam to act is 46, reversing middle screen 43, and finally cam 47 reversing topmost screen 44.

The rods 45b, 46b and 47b are guided in two brackets 48, fastened to the side of the percolating chamber 9, compelling them to move in a straight line. To compensate for the difference in distance caused by the angular movement of levers 45a, 46a and 47a, these levers are pivoted by means of rocker arms 45d, 46d and 47d, the rocker arms being pivotally supported by pin 49 on which they turn and which is supported by two brackets 50. The cams 45, 46 and 47 are substantially divided into two, each half having a circular groove, each groove belonging to one cycle of operation.

Figure 12:
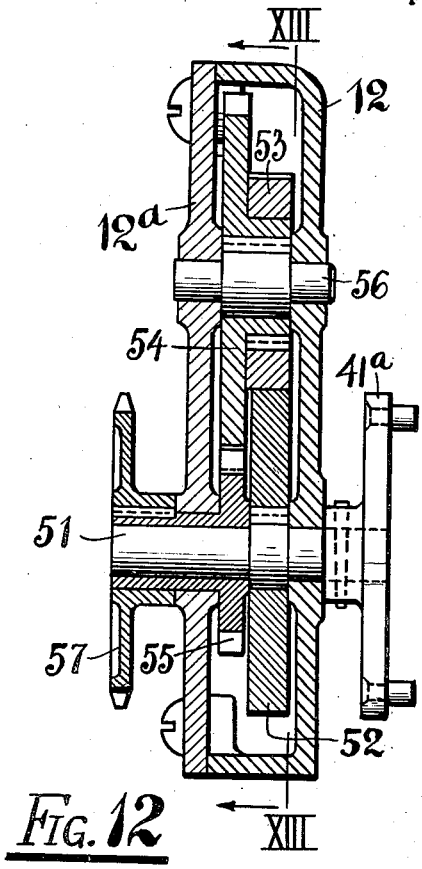
Fig. 12 is a vertical section through timing gear box.

Shaft 38 transmits power to the timing gear box 12 through coupling 41 of which 41a is one half (see Fig. 12), driving shaft 51. On shaft 51 is keyed an intermittent gear 52 which engages an intermittent pinion 53, the latter being keyed to gear 54 which engages pinion 55 which latter is free to rotate on shaft 51. Shaft 56, on which gear 54 with 53 is keyed serves merely as a countershaft. To the extended hub of gear 55 is keyed a chain wheel 57 which through chain 57a drives chain sprocket 58 (see Figs. 3 and 5), the latter actuating the movement of the dumping carriage 16. The intermittent gear 52 every half revolution (constituting one cycle of the operation of the machine) revolves the pinion 53 one quarter of a turn. The ratio of gear 54 to pinion 55 is 2 to 1, consequently the pinion 55 and with it chain sprocket 57 make one half revolution at the same time. The ratio of chain sprocket 57 to chain sprocket 58 is as 2 to 1, consequently chain sprocket 58 makes one complete turn per cycle. Mounted on sprocket 58 is a crank 59 which imparts reciprocating movement to dumping carriage 16 through lever 60, to be described in detail presently.

The adjustable cam 61 (Figs. 1, 30 and 29) controls an electric switch 103 stopping or starting motor 5a of the coffee mill 5. Cam 62 is simply a disc with a projecting pin that trips the switch 102 downwards and thereby admits current to solenoid 7.

The left half of 16a of coffee dumping carriage 16 (Fig. 25) has an extended hub 16c the bore of which serves as a bearing for the journal 63b of screen 63 and the cylindrical outside of which supports the ratchet case 64 and the ratchet wheel 65. 66 is a spacing collar. The ratchet case 64 is free to revolve on hub 16c and has one side milled out to receive ratchet wheel 65, three pawls 64b and three blade springs 64c (see Fig. 27) and is on the other side formed into a pinion 64a. On the upper side of track 17 is bolted a rack 68 positioned to engage pinion 64a when dumping carriage is moved toward dumping position. It is evident that when dumping carriage is moved to the right, the pinion 64a engaging rack 68 and with it the ratchet case 64, will revolve in the direction indicated by arrow on Fig. 27. One of the pawls 64b will then engage ratchet 65, causing same to turn and with it reverse the screen 63. The ratchet wheel 65 is by pin 65a through spacing collar 66 connected with screen journal 63b. To the carriage half 16b (Fig. 26) is fastened a blade spring 70 with a projection 70a, the latter corresponding in shape to two notches 69a in wheel 69, the latter being keyed to screen journal 63a. The object of this arrangement is to secure screen 63 in the horizontal position and prevent any accidental turning of same. On the return stroke of the dumping carriage 16 the pinion 64a with the ratchet case 64 will turn in the opposite direction of the arrow and will cause no movement of the screen.

To insure complete removal of the coffee grounds on screen 63, a stripper 71 is introduced, made of flexible material and pivoted on pin 72, the latter being supported by tracks 17—18. The stripper is counterbalanced by weight 74 and prevented from turning in one direction by notch 73, but free to turn in the opposite direction to clear the passing screen when dumping carriage 16 is moving towards dumping position. After the screen has passed the stripper on the forward stroke, the stripper resumes the position in Figs. 24 and 28, and will on the return stroke of the carriage strip the screen of any coffee grounds adhering to the underside of same.

The dumping carriage 16 is provided with 4 rollers 75 fitting on shaft 76; these rollers move in tracks 17 and 18, and the reciprocating movement of the carriage is caused by levers 60 and 60a, actuated by crank 59 on sprocket 58. These levers 60 and 60a, are pinned to shaft 77, therefore move in unison (see Fig. 5). Shaft 77 also serves as a fulcrum for the levers. In the movement of the dumping carriage 16, the screen 63 is utilized, the extensions 63c on same being provided with rollers 63d which slide in the lower slots of 60 and 60a.

Fig. 29 shows an adjustable cam, consisting of the center piece 61 with its two hubs 61c, on which hubs are slidably positioned the segments 61a and 61b. In order to clearly show the construction these three parts are shown in Figs. 29a, 29b and 29c in the position occupied on the assembly Fig. 29. Centerpiece 61 has a number of tapped holes 61e, concentrically located and has for a distance of 120° its diameter increased. The outer pieces are flat segments of 120°, the outside radii being equal to the larger radius of 61. Each segment is provided with a circular slot, the mean radius of which is equal to the pitch radius of the tapped holes 61e in centerpiece 61. The roller 78 has a width slightly in excess of the combined width of the three parts 61, 61a, and 61b. Therefore in sliding the segments on the hubs of centerpiece 61, and fastening them with screws, an effective cam surface may be obtained varying from 120° to nearly 360°. The roller 78 is mounted on a pin 79a in bracket 79, this latter being pivotally mounted in bracket 80. In bracket 79 an electric switch 103 is clamped, this switch controlling the current to coffee grinding motor 5a. In the position shown, the current is on and the motor 5a is running. In the dotted position the motor is idle. By adjusting the cam as described supra the same will hold the switch 103 in the "on" position in a longer or shorter period, according to the angle formed by 61a and 61b, thus varying the grinding time.

The delivery of the water from the measuring chamber 4a is controlled from shaft 35 which has a helical gear 81 engaging another helical gear 82 on shaft 83, the latter being supported in bearings 84 and 85; bearing 85 is located on top of header 4. At the upper end of shaft 83 is keyed a third helical gear 86, engaging a fourth helical gear 87, these helical gears being substantially alike with a ratio of 1 to 1. The gear 87 is keyed to shaft 88 (see Fig. 6), this latter carrying on its end a cam 89 and being supported by bracket bearing 90. The cam 89 upon revolving depresses roller 91 on lever 92, which lever at its other end lifts the valve stem 23 by acting on collar 97 which is pinned to the valve stem 23. The lever 92 pivots on a pin 95 in rocker arm 93, the latter being pivotably supported by pin 96 in bracket 94; this arrangement takes care of the difference in distance caused by the angular movement of lever 92, this lever being held in place at collar 97 by means of 2 pins 98 (Figs. 6 and 11). Rocker arm 93 is made wide to provide for lateral stability. (See Fig. 8.) The bracket 99 is provided to guide the valve stem 23.

Figure 14:
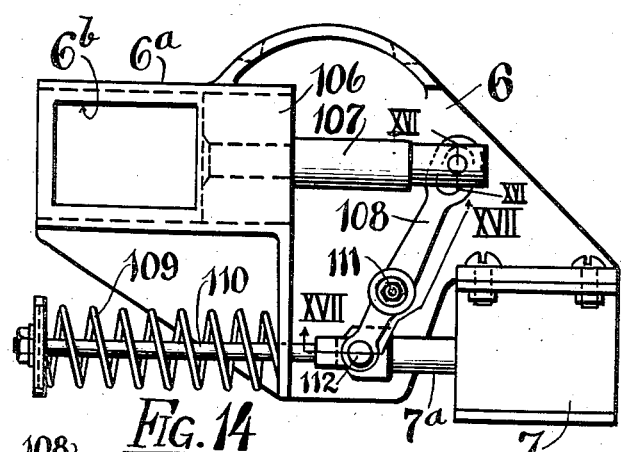
Fig. 14 is a plan view of coffee transferring mechanism.
Figure 15:
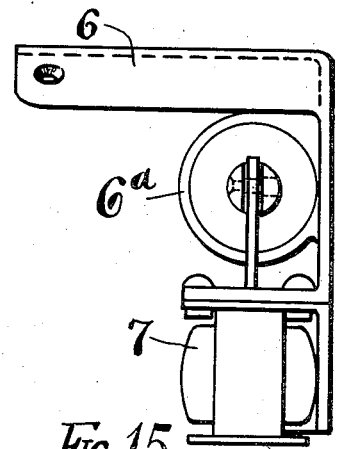
Fig. 15 is an elevation of coffee transferring mechanism.
Figures 16, 17:
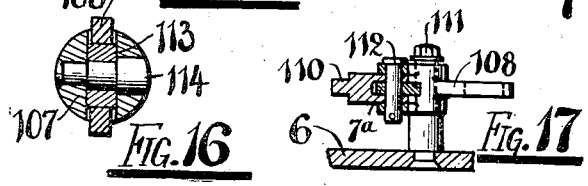
Fig. 16 is a section taken on line XVI—XVI on Fig. 14.
Fig. 17 is a section taken on line XVII—XVII Fig. 14.

The coffee mill 5 is of a conventional type having its hopper for roasted coffee beans on top and its electric motor 5a at the bottom, the ground coffee being discharged at spout 5b which communicates with chute 5c, the latter fitting into opening 6b of the cylinder 6a which is integral with bracket 6 (see Figs. 3, 14 and 15). A plunger 106 has a sliding fit in cylinder 6a and a plunger rod 107 fastened to plunger 106 is slotted at one end to receive lever 108, a roller 113 (see Fig. 16) being inserted on a pin 114 to engage the slotted portion of lever 108. The lever 108 turns on fulcrum stud 111, fastened to lower part of bracket 6. The solenoid plunger 7a is with a pin 112 connected with both lever 108 and spring stem 110. When the solenoid is energized, plunger 7a pulls the lever 108 towards the solenoid causing the plunger rod 107 with plunger 106 forward pushing the ground coffee which has been delivered from the coffee mill during the preceding cycle out into the percolating chamber. As soon as the current is off the solenoid, the helical spring 109 forces the whole system back to its original position.

To insure against any coffee being transferred from coffee mill 5 to cylinder 6a during the movement of the solenoid, a gate 107a fastened to plunger rod 107 operates to close chute 5c, then opens chute again on the return movement.

The control of the coffee level in coffee storage tank 19 is accomplished in following manner: A float 117 (Fig. 3) is carried by a tubular rod 118 which closes over the lower end of a rod 119. When the coffee in the receptacle 19 reaches the desired level the upper end of the tube strikes a collar 119a adjustably secured to rod 119 and raises this rod until it engages and rocks a pivoted bracket 120, in which the electric switch 101 is clamped, thus opening the switch and breaking the current to motor 13.

In order to secure clear coffee a filter is provided to be positioned on top of the liquid coffee receptacle 19 (see Figs. 3, 31, 32 and 33). This filter consists of a wire frame 115 and a filter cloth 116. The frame 115 consists of longitudinal wires 115a and cross wires 115b with a solid plate 115c, extending upwardly at an angle. Two angle clips 115d confine one end of the frame to the side of the coffee receptacle 19 and 2 spring clips 115e keep the frame securely in position. Two hooks 115f are fastened to plate 115c to receive the filter cloth 116, and the ends of the cross wires 115b are shaped into hooks 115g the purpose of which is to secure the straining cloth 116 by means of the eyelets 116a. It will be seen that the filter cloth 116 which is drawn to a reduced scale has eyelets 116a which correspond to hooks 115f and 115g. At intervals this complete frame is removed and a clean one is put in its place.

For removal of the gases from burner 25, a tube 121 is connected to boiler 1 in following manner: The lower end of tube 121 is substantially increased and turned to fit into the bored portion of the corner 1a of boiler 1. A packing 123 is inserted above the increased portion of tube 121 and a packing gland 122 is slipped over the tube 121 and is screwed down, pressing down packing 123 and subsequently tube 121 against the shoulder of the bored portion of boiler 1. The tube 121 extends upwardly inside riser 3 through header 4 into the atmosphere, also adding to the efficiency of the heating system, leaving the exhaust gases at a lower temperature than otherwise would have been the case.

The cycle of operation is as follows: As previously explained, at the beginning of the cycle, chain sprocket 57 making one half revolution causes sprocket 58 to make a full turn, the crank 59 and levers 60 and 60a taking dumping carriage 16 to and from dumping position, during which movement dumping carriage screen 63, is reversed, and stripped of coffee. Immediately thereupon screen 42 is reversed by cam 45, the coffee supported by said screen being dropped to moving carriage screen 63. Directly thereupon screen 43 is reversed by cam 46, dropping its coffee to screen 42, whereupon screen 44 is reversed by cam 47, its coffee being dropped to screen 43. The coffee, ground in the previous cycle, is at this moment contained in cylinder 6a (Figs. 14 and 15). The cam 62 (Fig. 1) now trips the electric switch 102 energizing solenoid 7, whereupon the coffee is pushed out into percolating chamber as previously explained. The cam 89 (see Figs. 6 and 7) now takes hold of lever 92 lifting the valve 22 whereupon the water is delivered to percolating chamber.

Figure 13:
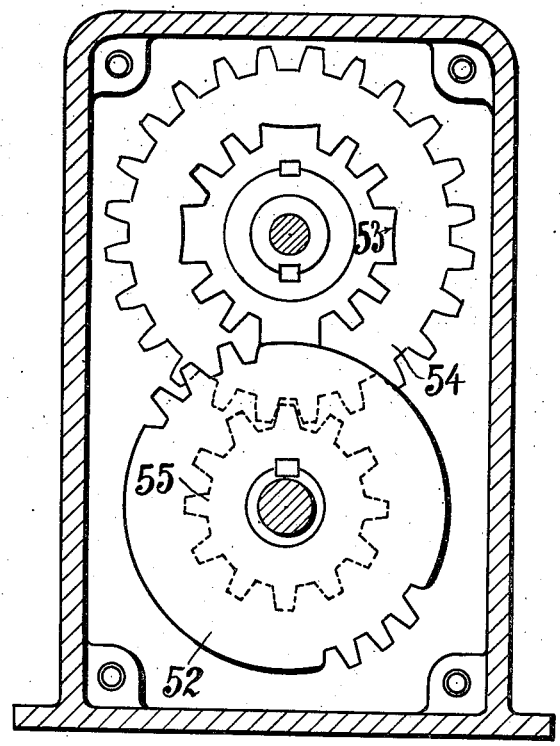
Fig. 13 is a section taken on line XIII—XIII on Fig. 12.

Looking at intermittent gear 52 (Fig. 13) it is evident that we now have a comparatively long period ("dwell") during which no motion takes place of the timing gear. During this dwell the hot water percolates through all the coffee supporting screens, the liquid coffee running onto the filter 115 and 116 and into the liquid coffee receptacle. During this dwell the coffee for the next cycle is ground in the coffee mill 5.

Figure 2:
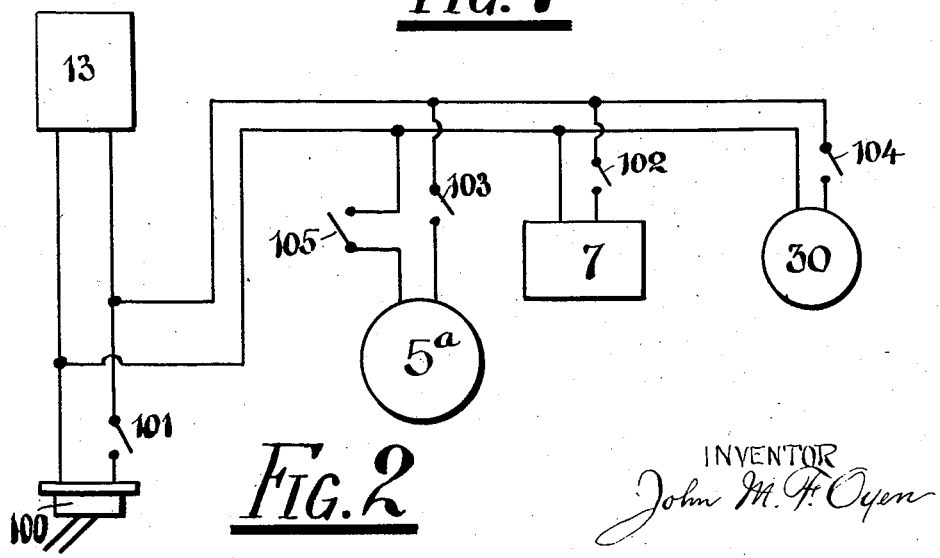
Fig. 2 is a wiring diagram, showing the electrical circuits.

Referring to wiring diagram (Fig. 2) the manually operated switches 100 and 105 will be closed when starting the machine to make coffee. It will be seen that when switch 101 opens, the entire mechanism will be stopped. During the operation of the machine, switch 103 will control the motor 5a, switch 102 the solenoid 7 and switch 104 the water supply magnetic valve 30.

To clean the machine open switch 105 which will cut off the coffee supply. Hot water will then run through the machine and clean it.

Having thus described my invention, what I claim and desire to secure by Letters Patent is:

1. In a coffee making machine, a plurality of mutually superposed coffee supporting screens, means for intermittently inverting the screens in timed relation to cause coffee supported by them to be advanced downwardly step by step, and means for supplying water to percolate through the coffee supported by the screens.

2. In a coffee making machine, a plurality of mutually superposed coffee supporting screens and means for intermittently inverting the screens in time relation to discharge coffee supported by them and position them for reception of coffee on their opposite sides.

3. In a coffee making machine, a vertically disposed percolating chamber, pivotally supported coffee screens in said chamber, means for feeding measured charges of fresh dry coffee to the topmost screen, means for intermittently inverting the screens in timed relations to effect transfer of said charges from screen to screen downwardly through the percolating chamber and means for supplying hot water to the top of said chamber to percolate through the coffee supported on said screens.

4. In a coffee making machine, a vertically disposed percolating chamber, pivotally supported coffee screens in said chamber, means for feeding measured charges of fresh dry coffee to the topmost screens, means for intermittently inverting the screens in timed relation to effect transfer of said charges from screen to screen downwardly through the percolating chamber, means for supplying hot water to the top of said chamber to percolate through the coffee supported on said screens and means for imparting a whirling motion to the water to facilitate the initial percolation.

5. In a coffee making machine, a vertically disposed percolating chamber, pivotally supported coffee screens said chamber, means for feeding charges of fresh dry coffee to the topmost screen, means for intermittently inverting the screens at timed intervals to effect transfer of said charges from screen to screen downwardly through the percolating chamber, a screen beneath said chamber to finally receive said charges of coffee and automatic means for removing last named screen from beneath the chamber and discharge coffee therefrom.

6. In a coffee making machine, a vertically disposed percolating chamber, pivotally supported coffee screens in said chamber, means for feeding charges of fresh dry coffee to the topmost screen, means for imparting pivotal movement to the screens to effect transfer of said charges from screen to screen downwardly through the percolating chamber, a screen beneath said chamber to finally receive said charges of coffee, means for removing the last named screen from beneath the chamber and discharge coffee therefrom and means for inverting said screen.

7. In a coffee making machine, a vertically disposed percolating chamber, pivotally supported coffee screens in said chamber, means for feeding charges of fresh dry coffee to the topmost screen, means for imparting pivotal movement to the screens to effect transfer of said charges from screen to screen downwardly through the percolating chamber, a screen beneath said chamber to finally receive said charges of coffee; means for removing the last named screen from beneath the chamber, means for inverting said screen and means for stripping the coffee therefrom.

8. In a coffee making machine, a vertically disposed percolating chamber, pivotally supported coffee screens in said chamber, means for feeding charges of dry fresh coffee to the topmost screen, means for imparting pivotal movement to the screens to effect transfer of said charges from screen to screen downwardly through the percolating chamber, a screen beneath said chamber to finally receive said charges of coffee, means for removing the last named screen from beneath the chamber, means for inverting said screens, means for stripping the coffee therefrom, a liquid coffee container and a filter between the last named screen and the liquid coffee container.

9. In a coffee making machine, a vertically disposed percolating chamber having superposed coffee supporting screens and means for feeding measured charges of fresh coffee thereto, said means comprising a hopper for roasted coffee beans, means for grinding the coffee beans, means for varying the duration of the grinding time, means for transferring the ground coffee to the topmost screen in said chamber, means for delivery of water to said chamber, and means for intermittently inverting said screens at intervals whereby the charges of coffee are transferred from screen to screen.

10. In a coffee making machine of the character described, comprising in combination, a hot water supply; means for automatically controlling the temperature of the water; means for automatically adding water and maintaining the water level in said hot water supply; a percolating chamber mounted adjacent to said hot water supply; a plurality of coffee supporting screens vertically disposed in said percolating chamber; automatic means for grinding coffee mounted adjacent to said percolating chamber; adjustable automatic means for governing the grinding time of said coffee grinding means; automatic means for transferring measured quantities of ground coffee from said coffee grinding means to the topmost coffee supporting screen; automatic means for intermittently inverting said coffee supporting screens thereby transferring the charges from screen to screen, and automatic means for admitting hot water at intervals to the topmost coffee supporting screen.

11. In a coffee making machine of the character described, comprising in combination, a hot water supply; means for automatically controlling the temperature of the water; means for automatically adding water and maintaining the water level in said hot water supply; a percolating chamber mounted adjacent to said hot water supply; a plurality of coffee supporting screens vertically disposed in said percolating chamber; automatic means for grinding coffee mounted adjacent to said percolating chamber; adjustable automatic means for governing the grinding time of said coffee grinding means; automatic means for transferring measured quantities of ground coffee from said coffee grinding means to the topmost coffee supporting screen; automatic means for intermittently inverting said coffee supporting screens thereby transferring the charges from screen to screen; a container for finished coffee liquid mounted below said percolating chamber; an automatic level control placed in said liquid coffee container, drive means for operating said coffee grinder, hot water valve and screens, and switching means operated by the level control in the liquid coffee container whereby the drive means are started and stopped automatically to maintain a constant level of finished liquid coffee.

12. An automatic coffee making machine such as claimed in claim 11 where said automatic means for admitting hot water comprise a cam operated valve driven by the drive means and actuated at predetermined intervals; and where said coffee measuring means consist of a solenoid operated plunger actuated at predetermined intervals by timing means driven by said drive means.

JOHN M. F. OYEN.